Dec. 13, 1949   C. R. BUSCH   2,491,086
BRAKE BEAM
Filed Feb. 11, 1946   2 Sheets-Sheet 1
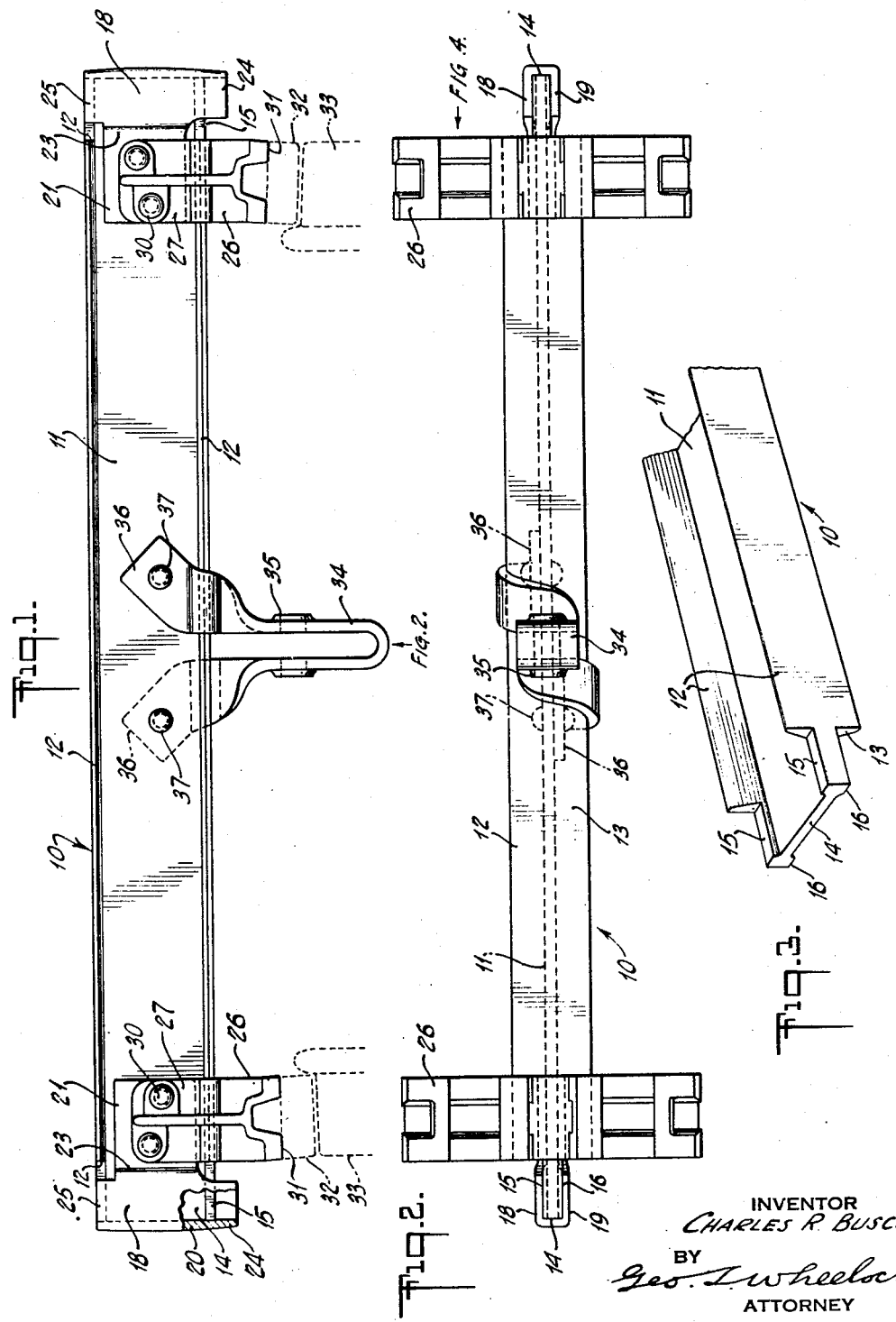
INVENTOR
CHARLES R. BUSCH.
BY
Geo. T. Wheelock
ATTORNEY Dec. 13, 1949     C. R. BUSCH     2,491,086
BRAKE BEAM
Filed Feb. 11, 1946     2 Sheets-Sheet 2
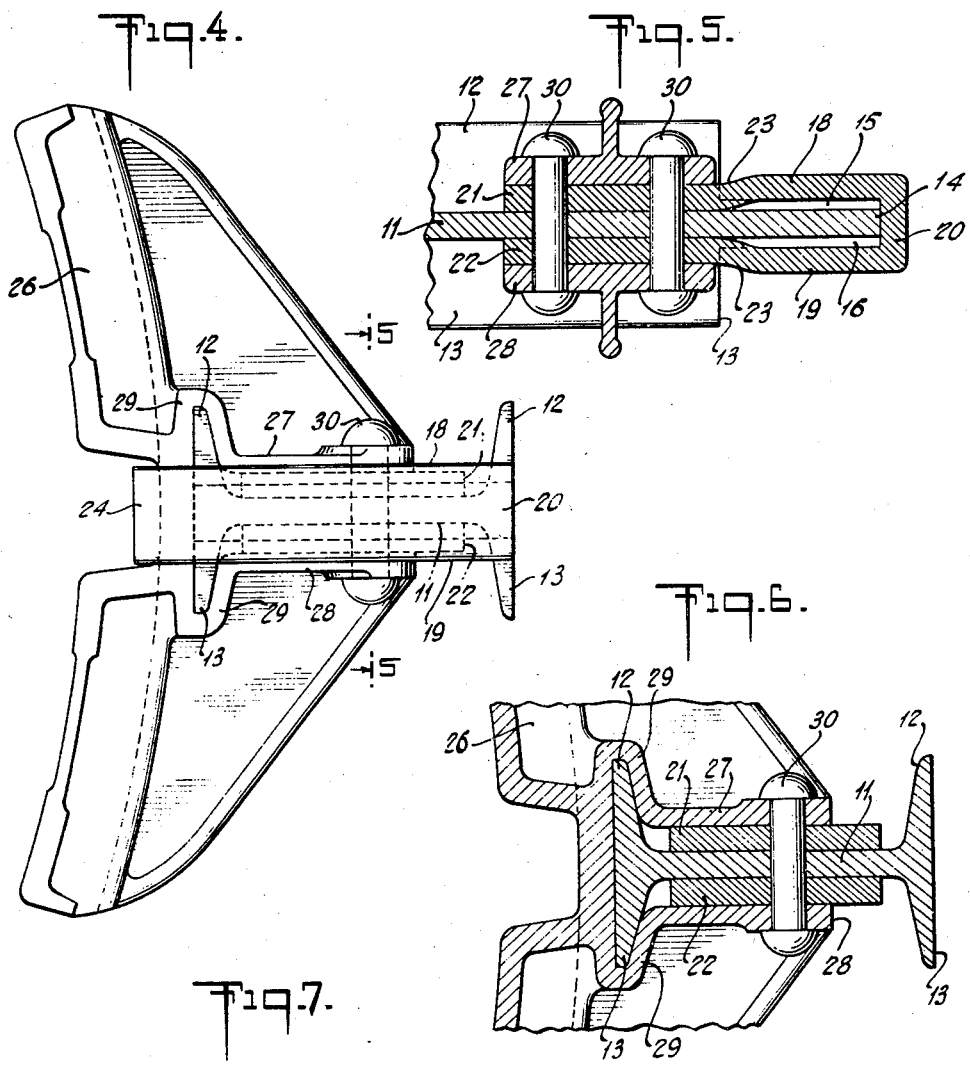
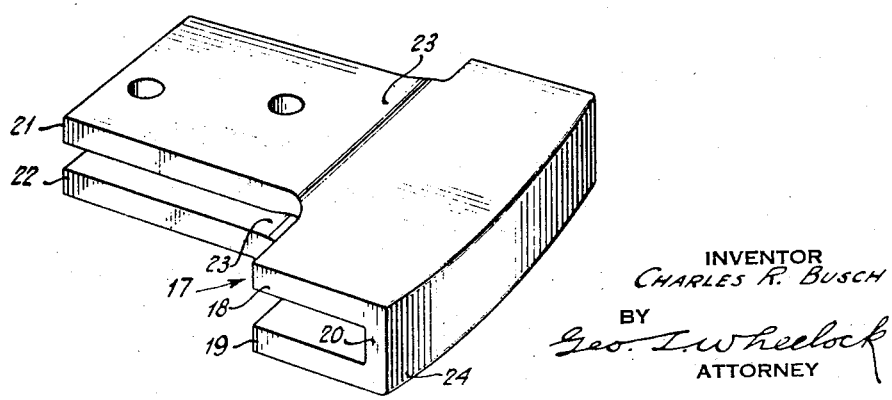
INVENTOR
CHARLES R. BUSCH
BY
Geo. I. Wheelock
ATTORNEY Patented Dec. 13, 1949

2,491,086

UNITED STATES PATENT OFFICE 2,491,086

BRAKE BEAM

Charles R. Busch, Orange, N. J., assignor to Buffalo Brake Beam Company, New York, N. Y., a corporation of New York Application February 11, 1946, Serial No. 646,810

9 Claims. (Cl. 188—233.3)

The present invention relates more particularly to brake beams for railway cars, such as preferably include a solid bar forming the beam proper, adapted to extend transversely of a car truck and to be guided at its terminals on supporting members of the truck.

An object of the invention is to make the brake beam proper with a web which is to substantially parallel the plane of the track when the beam is in position and also with preferably upright walls or flanges on one or both edges of the web, as provided for example by an I-beam, and to so fabricate the guiding terminals of the beam proper as to provide them with reinforcements extending longitudinally thereof but which are of rather less depth than such walls or flanges.

In connection with the so constructed brake beam proper, another object is to provide the same with wear members and brake heads rigidly mounted thereon, the said wear members extending within the backs of the brake heads and also extending out from them laterally thereof, and the outwardly extending portion of the wear members being firmly engaged with and supported by the reinforcements of the aforesaid guiding terminals to protect the latter against wear, while the inward portions of the wear members are in firm contact with the web of the beam proper, the brake heads closely embracing the inward portions of the wear members to hold them solidly against the web of the beam proper, so that when the beam, wear members and brake heads are riveted together an exceedingly strong and reliable braking construction is provided.

Other objects and advantages of the construction, in combination and individually, will appear from the following description of the accompanying drawings which disclose a preferred form of the invention, and in which Fig. 1 is a plan of the improved brake beam complete;

Fig. 2 is a front elevation thereof;

Fig. 3 is a perspective view of an end portion of the brake beam proper;

Fig. 4 is an end elevation of the complete brake beam;

Fig. 5 is a section on line 5—5, Fig. 4;

Fig. 6 is a transverse section of the complete brake beam, the brake head being shown partly broken away; and Fig. 7 is a perspective view of the wear member.

Referring to Figs. 1, 2 and 3 the brake beam proper 10 is shown as having a web 11 and parallel longitudinal walls or flanges 12 extending in one direction from the web and other such walls or flanges 13 extending therefrom in the opposite direction, when and if the beam is of I-section as is preferred, the beam shown being of standard rolled type.

Each end of the beam has a terminal portion 14 so that the beam may be supported and guided along side members of a car truck in applying and releasing the brake, as is now practiced more or less on American railroads. Each terminal portion 14 is a continuation of the web 11 and has longitudinal reinforcing ribs 15, 16, extending along opposite edges of the web thereof. The said ribs are preferably formed by milling and reducing the flanges or walls 12, 13, to such extent that they preferably project only a relatively slight distance from the web of the terminal portion. Each of the ribs is of the same height throughout, that is for the entire distance between the flange from which it emerges to the end edge of the brake beam.

Referring to Fig. 7, there is shown a member 17 to fit like a cap or shoe onto each end of the beam proper 10, and it is best made of harder metal than that of the beam proper 10 for the reason that it is to protect the end of the beam against wear during the application and release of the brake.

As shown, the wear member 17 is preferably of U-shape in longitudinal section, with parallel upper and lower walls 18, 19, and a slightly arcuate transverse boundary wall 20, and these walls constitute that portion of the wear member which is applied to the terminal portion 14 of the beam to protect the same.

Extending from the walls 18 and 19 in planes parallel therewith are tongues or walls 21, 22, respectively, which constitute inward portions of the wear members 17 when they are mounted on the brake beam, and said walls 21, 22, are narrower than the distance between the side edges of the walls 18, 19. The width of said tongues is really less than the distance between the flanges 12, 13, on opposite edges of the web of the beam.

It will be seen from Figs. 5 and 7 that the tongues or walls 21, 22, are closer together than the walls 18, 19, which is due to bending the blank from which the wear member is made so that outward transverse shoulders or bends 23 are provided where the tongues 21, 22, join with walls 18, 19.

Preferably the wear member is of general T-shape in plan to provide, when the same is in position, a forward nose portion 24 and a more or less corresponding rear portion 25, Fig. 1, which does not project preferably behind the beam.

The brake head 26 is of symmetrical shape, that is it has corresponding halves above and below the middle horizontal plane thereof, so that it is adapted to be reversed for service upon either end of the brake beam. The back of the brake head has a pair of parallel jaws 27, 28, which more or less form a back socket, at the forward end of which the jaws are deflected outwardly from the middle horizontal plane of the head, as shown in Figs. 4 and 6, to provide opposite, recessed or channeled, embracing seat-portions 29, 29, which extend transversely of the jaws and in opposite direction from each other.

In assembling the elements of the complete brake beam the brake head and wear member are preferably first assembled to form a unit, so that as shown the wear protecting portion 18, 19, 20, of the member 17 will extend outwardly beyond one lateral side of the brake head, with the narrower tongues 21, 22 thereof in a slide fit engagement with and between the portions of the jaws 27, 28, which are rearward of the head seating portions 29, 29. The lateral side of the brake head, beyond which the wear member is to extend, will depend upon which end of the beam the head is to be fitted, and as the wear member is also reversible for either end of the beam both said member and the head constitute a universal unit when assembled.

Having assembled the two parts of such unit, one assembly is mounted on each end of the brake beam proper 10 by forcibly pressing the tongues 21, 22, along the opposite surfaces of the web thereof, thereby pushing the brake head onto the forward flanges or walls of the latter by sliding the seats or embracing portions 29, 29, along said flanges. When the assembly is fully pushed into position the transverse end edges of the forward flanges of the beam will be substantially flush with the outwardly presented lateral side of the brake head.

As the tongues 21, 22, are sufficiently narrow to pass between the flanges at both edges of the brake beam proper they will be pushed along in full bearing contact with the web 11, and as the brake head is firmly mounted on the forward flanges and in firm bearing on the said tongues a snug fit of all of these parts is obtained, so that when the rivets 30 are driven and headed down a most solid and durable construction is assured.

When the wear member 17 is in its full position the parallel walls of the wear protecting portion thereof will be firmly seated on the ribs 15, 16, of the terminal portion 14 of the beam, while between the said ribs the mutually facing surfaces of the wear member and the web of said terminal portion will be spaced a slight distance apart. Such arrangement imparts a desirable vertical thickness to the protected end of the brake beam and does not require a thicker and heavier wear member as might otherwise be the case.

As indicated in broken lines in Fig. 1 the faces 31, 31, of the brake heads are laterally inclined or canted slightly inward towards each other, so that the brake shoes 32, 32, thereon will be correspondingly inclined to in turn correspond with the degree of bevel of the treads of the car wheels 33, 33.

Figs. 1 and 2 illustrate a pull bracket located at the mid-length of the brake beam, and consisting of a metal strip 34 bent double to form a loop having eyes 35 to receive the pivot of a brake lever for operating the brake. The ends 36, 36, of the bracket are twisted and bent outwardly away from each other in two different planes for attaching by rivets 37, 37, to the upper and lower surfaces of the brake beam.

It will be obvious to those skilled in the art that modifications can be made of the invention and its members without departing from the scope of the appended claims.

What I claim as new is

1. In combination, a brake beam including a longitudinally flanged web and a terminal portion of the web beyond the flange, such terminal portion having a longitudinal reinforcing rib of reduced height relative to that of the flange and extending from a point adjoining the flange, and a wear member attached at its inner end portion to the web inwardly of the adjacent end of the flange and extending outwardly along and supported upon the rib, the rib supported portion of the wear member protecting the terminal portion of the beam against wear when the beam is supported for guidance on car truck members.

2. A brake beam according to claim 1, including a brake head inwardly of the extended and ribbed terminal portion of the beam, the head having a back socket-portion with an inward recess transversely thereof, the socket-portion receiving the web, the end of the flange and the inner end portion of the wear member, and the web-flange engaged in the transverse back recess of the brake head.

3. A brake beam, including a bar adapted to extend transversely of a railway car truck and to be guided at its terminals upon supporting members of the truck, the bar having substantially vertical walls extending there along and a terminal portion of the web beyond the walls, said terminal portion having ribs there along which are in line with the vertical walls and are of relatively less height than the walls, and a wear member extending around the terminal portion of the web and supported on the ribs, such wear member having portions extending inwardly along and contacting the web at points laterally of said walls.

4. A brake beam, including an I-bar adapted to extend transversely of a railway car truck and to be guided at its terminals upon supporting members of the truck, the web of the I-bar having a terminal portion beyond its flanges provided with longitudinal reinforcing ribs in line with the flanges and of less height than the flanges, and a wear member extending around the terminal portion beyond the flanges and supported on the ribs, such wear member having portions inwardly along and seated against the web at points between the flanges.

5. A brake beam according to claim 4, in which the mutually facing surfaces of the inward portions of the wear member are spaced a less distance apart than the corresponding surfaces of the wear member which are beyond the flanges.

6. A brake beam according to claim 4, also including a brake head having a back socket interlocking with a pair of the flanges of the web just inwardly of the extended terminal and ribbed portion of the beam and closely seated upon the inward portions of the wear member.

7. A brake beam including a bar adapted to extend transversely of a railway car truck and to be guided at its terminals upon supporting members of the truck, the bar having a web with upright walls there along extending in the same direction away from the web, and a terminal portion of the web beyond the walls, a U-shaped wear member having a protecting portion extending around the terminal portion of the web, the terminal portion having means for supporting such portion of the wear member thereupon while mainly out of contact therewith, and the wear member having a pair of inward tongues bearing on such web.

8. A brake beam, comprising a web having longitudinal flanges at opposite edges, the beam having terminal portions beyond the flanges adapted to support and guide the beam laterally upon opposite side members of a railway car truck, each of such terminal portions having ribs in line with the flanges, which ribs are of less height than the flanges for the entire distance therefrom to the transverse end edges of the brake beam, the web and the ribs providing areas above and below the web adapted to receive wear protecting members for the terminal portions.

9. A wear protecting member for a brake beam adapted to be guided along side members of a railway car truck, such wear member comprising a cap having an outermost boundary wall and adapted to be fitted on to either end of such brake beam to protect the beam against wear, the cap having spaced, substantially parallel, upper and lower walls connected by the boundary wall and a single pair of tongues extending inwardly away from the spaced walls and substantially parallel therewith, the area of each tongue of the single pair lying in one plane, the tongues spaced apart less than the spaced walls, and providing shoulders forming the junctures between the said spaced walls and the tongues, each shoulder extending the width of one tongue of the single pair, the boundary wall, the spaced walls, the tongues and the shoulders completing the wear member, and the single pair of tongues adapted to have a brake head fitted thereon, the thus extending shoulders adapted to restrict the position of the brake head, and the spaced walls constituting the wear protection portion proper of the wear member.

CHARLES R. BUSCH.

REFERENCES CITED

The following references are of record in the file of this patent:

UNITED STATES PATENTS

| Number | Name | Date |
|---|---|---|
| 784,698 | O'Connor | Mar. 14, 1905 |
| 790,058 | Hopkins | May 16, 1905 |
| 1,296,574 | Wait | Mar. 4, 1919 |
| 1,654,270 | Powell | Dec. 27, 1927 |
| 1,759,935 | Chanter | May 27, 1930 |
| 2,010,319 | Peycke | Aug. 6, 1935 |
| 2,193,580 | Busch | Mar. 12, 1940 |
| 2,368,854 | Leverenz | Feb. 6, 1945 |

FOREIGN PATENTS

| Number | Country | Date |
|---|---|---|
| 39,036 | Austria | of 1909 |